(12) United States Patent  
Porikli et al.

(10) Patent No.: US 8,718,380 B2  
(45) Date of Patent: May 6, 2014

(54) REPRESENTING OBJECT SHAPES USING RADIAL BASIS FUNCTION SUPPORT VECTOR MACHINE CLASSIFICATION

(75) Inventors: Fatih Porikli, Watertown, MA (US); Hien Nguyen, College Park, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 321 days.

(21) Appl. No.: 13/026,469

(22) Filed: Feb. 14, 2011

(65) Prior Publication Data

US 2012/0207384 A1   Aug. 16, 2012

(51) Int. Cl.
```
G06K 9/46      (2006.01)
G06K 9/00      (2006.01)
G06K 9/62      (2006.01)
G06K 9/48      (2006.01)
G06K 9/66      (2006.01)
```

(52) U.S. Cl.
USPC ........... 382/203; 382/103; 382/155; 382/159; 382/195; 382/199; 382/209; 382/224; 382/225

(58) Field of Classification Search
None
See application file for complete search history.

(56) References Cited

PUBLICATIONS

Dalal, et al., "Histograms of oriented gradients for human detection." Computer Vision and Pattern Recognition, 2005. CVPR 2005. IEEE Computer Society Conference on. vol. 1. IEEE, 2005, p. 1-8.*

Mori, et al. "Efficient shape matching using shape contexts." Pattern Analysis and Machine Intelligence, IEEE Transactions on 27.11 (2005): 1832-1837.*

Okada, et al. "Relevant feature selection for human pose estimation and localization in cluttered images." Computer Vision—ECCV 2008. Springer Berlin Heidelberg, 2008. 434-445.*

Elgammal. "Nonlinear generative models for dynamic shape and dynamic appearance." Computer Vision and Pattern Recognition Workshop, 2004. CVPRW'04. Conference on. IEEE, 2004.*

Ngo, et al. "Fast tracking of near-duplicate keyframes in broadcast domain with transitivity propagation." Proceedings of the 14th annual ACM international conference on Multimedia. ACM, 2006.*

Belongie, et al. "Shape matching and object recognition using shape contexts." Pattern Analysis and Machine Intelligence, IEEE Transactions on 24.4 (2002): 509-522.*

Karayiannis, Nicolaos B. "Reformulated radial basis neural networks trained by gradient descent." Neural Networks, IEEE Transactions on 10.3 (1999): 657-671.*

Carr, Jonathan C., et al. "Reconstruction and representation of 3D objects with radial basis functions." Proceedings of the 28th annual conference on Computer graphics and interactive techniques. ACM, 2001.*

Eichhorn, Jan, and Olivier Chapelle. "Object categorization with SVM: kernels for local features." (2004).*

Maji, Subhransu, and Jitendra Malik. "Fast and accurate digit classification." EECS Department, University of California, Berkeley, Tech. Rep. UCB/EECS-2009-159 (2009).*

(Continued)

Primary Examiner — Thomas Conway
(74) Attorney, Agent, or Firm — Dirk Brinkman; Gene Vinokur

(57) ABSTRACT

A shape of an object is represented by a set of points inside and outside the shape. A decision function is learned from the set of points an object. Feature points in the set of points are selected using the decision function, or a gradient of the decision function, and then a local descriptor is determined for each feature point.

21 Claims, 5 Drawing Sheets

(56) References Cited

PUBLICATIONS

Meng, Long, et al. "Directional entropy feature for human detection." Pattern Recognition, 2008. ICPR 2008. 19th International Conference on. IEEE, 2008.*

Morse, Bryan S., et al. "Interpolating implicit surfaces from scattered surface data using compactly supported radial basis functions." ACM SIGGRAPH 2005 Courses. ACM, 2005.*

Zhan, Yiqiang, and Dinggang Shen. "Design efficient support vector machine for fast classification." Pattern Recognition 38.1 (2005): 157-161.*

Tirronen, Ville, et al. "Multiple order gradient feature for macro-invertebrate identification using support vector machines." Adaptive and Natural Computing Algorithms. Springer Berlin Heidelberg, 2009. 489-497.*

Jia, Hui-Xing, and Yu-Jin Zhang. "Human detection in static images." Pattern Recog. Tech. App.: Recent Advances 1 (2008): 227-243.*

F. Stuenke et al. "Support Vector Machines for 3D Shape Processing," Eurographics 2005, vol. 24, No. 3, 2005, pp. 285-294, XP002675715, Section 3. "Surface Reconstruction," Fig. 3-7.

H. Sahbi et al. "Object Recognition and Retrieval by Context Dependent Similarity Kernels," Proc. Content-Based Multimedia Indexing (CBMI' 2008), Jun. 18, 2008, pp. 216-223, XP002675716, Section 1.1 Motigation and Contribution, Section 2, "Kernal Design".

B. Scholkopf et al.: Object Correspondence as a Machine Learning Problem. Proc. 22-nd International Conference on Machine Learning, Bonn, Germany, 2005, pp. 776-783, XP002675717, section 3. "Learning Correspondence".

* cited by examiner

REPRESENTING OBJECT SHAPES USING RADIAL BASIS FUNCTION SUPPORT VECTOR MACHINE CLASSIFICATION

RELATED APPLICATION

This U.S. patent application is related to U.S. patent application Ser. No. 13/026,382, filed Feb. 14, 2011, co-filed herewith, and incorporated by reference.

FIELD OF THE INVENTION

This invention relates generally to representing shapes of objects, and more particularly to representing the shapes using radial basis function (RBF) support vector machine (SVM) classification.

BACKGROUND OF THE INVENTION

Shape Representation

Shape of an object represents the geometrical information that is independent of the transformational (scaling, rotation, articulation, etc) effects. Understanding shape is essential in major computer vision applications from design and inspection in industrial manufacturing to content based retrieval in visual data search engines to surgical planning and monitoring of changes in medical systems to recognition of people and their actions in video surveillance to analysis of compositions in architecture and archeology.

Recent psychophysical findings suggest that the perceptual representation of shape is primarily based on qualitative properties whose topological structures remain relatively stable over transformational (viewpoint, articulation) conditions. Other empirical studies have shown that the neural processing of shape in the brain is broadly distributed throughout the ventral (what) pathway that is involved in object recognition, and the dorsal (where) pathway that is involved in spatial localization. In other words, an adequate mathematical representation of shape needs to be invariant to viewpoint changes and articulated object motion, and discriminative enough to enable detection and classification.

Two main approaches dominate previous work on shape representation: global approaches model an object as a whole segment, while part-based approaches advocate segmentation of shape into constituent regions. The drawback of a purely global approach is the exclusion of articulation and the sensitivity to occlusion. The drawback of a purely part-based approach is that a consistent partitioning is generally not possible in the face of numerous combinations of possibilities and object shape variations. Besides, segmentation itself is ill-posed, except under controlled environments or for restricted application domains.

Global models cover a wide range of methods including statistical moments, eigenshapes, curvature scale space, elastic matching, SIFT, parametric curves (polylines), image signatures, etc. Zernike moments are a class of orthogonal moments that can be defined invariant to rotation and translation. Eigenshapes decompose a distance matrix of boundary points into an ordered set of eigenvectors and finds the modes of these eigenvectors. Elastic matching evaluates the similarity as the sum of local deformations needed to change one shape into another. Scale space representation successively smoothens the contour while decreasing the number of curvature zero crossings. In general, global models need supplementary mechanisms to normalize for affine transformations.

In comparison, parts based approaches describe shapes in terms of their part structure. Parts are defined to be nearly convex shapes separated from the rest of the object at concavity extrema. It is possible to build a discriminative classifier from a collection of parts or features to solve correspondence. These methods often require a multitude of training samples, prior knowledge on the number of parts, and precise formulation of articulation.

Other part-based methods try to learn the part structure by considering the shape interior. For instance, shock graphs are defined as the cyclic tree of singularities of a curve evolution. The inner-distance, geodesic distance and random walk also consider the interior of the shape to build descriptors. Given a pair of points, the inner-distance is determined by finding their closest points on the shape skeleton, then measuring the distance along the skeleton. The geodesic distance is the length of the shortest path on the surface. While shock graphs benefit from the skeleton's robustness to articulation they suffer from boundary noise. The inner and geodesic distances are robust to disturbances along boundaries, yet they are highly sensitive to occlusions and fragmentations.

Pioneering work of the spin image describes the relative spatial distribution of shape points around a set of feature points. It considers a cylindrical support region and accumulates a histogram of points. The shape context is similar to the spin image except that the support region is a sphere. Because both generate sparse matrices, the distance computation becomes sensitive to the shape structure.

The above methods provide satisfactory results under ideal conditions with strong priors and clean segmentation masks. Their representation capacity substantially degrades when the shape boundary is noisy (part based methods, shock graphs), shape has internal crevices, branching offshoots and excessive discontinuities (inner-distance, spin images, shape context), and non-conforming articulations (global models). Besides, they would not necessarily extent into higher dimensions or generalize over most shape classes.

It is desirable to have a representation that competently applies to real world examples, provides robustness against noise and perturbations, and successfully models in 2D, 3D and even higher dimensions. Such a representation should also infer all types of shapes while requiring no priors about their parts, underlying geometrical transformations and possible articulations.

Support Vector Machine Classification

A support vector machine (SVM) constructs a hyperplane in a high (or infinite) dimensional feature space between a set of labeled empirical input vectors x that can be either +1 or −1 by definition for binary SVMs. The decision boundary is defined in terms of a typically small subset of training examples called as support vectors that result in a maximum margin separation between these classes. The decision function of support vector machines is given as $$f(x) = \sum_{i=1}^{m} \alpha_i [\phi(x) \cdot \phi(x_i^*)],$$

where $x_i^*$ are support vectors, $\alpha_i$ are the corresponding weights of the support vectors, and $\phi$ is a mapping function in some dot product space H. By defining a similarity measure k in H as $$k(x, x_i^*) = \phi(x) \cdot \phi(x_i^*)$$

every dot product in the decision function is replaced by a kernel function. This allows the algorithm to fit the hyperplane in a transformed feature space H. The transformation may be non-linear and the transformed space high dimensional; thus though the classifier is a hyperplane in the high-dimensional feature space, it may be non-linear in the original input space. If the kernel used is a Gaussian, the corresponding feature space is a Hilbert space of infinite dimension $$\phi(x)\cdot\phi(x^*_i)=\exp(-\gamma\|x-x^*_i\|^2)$$

By using RBF, it is always possible to find a solution that correctly classifies the training data. Such a decision function has the form $$f(x) = \sum_{i=1}^{m} \alpha_i \exp(-\gamma\|x - x_i^*\|^2),$$

and the final decision is made by $$l(x)=\text{sign}[f(x)].$$

It is worth noting that the set of support vectors is usually small in compare with the entire training set.

ν-SVM

The above binary SVM algorithm learns a classifier from a set of positive and negative samples. We employ ν-SVM for training the decision function as its parameters has a natural interpretation for shapes. Learning problem is formulated as the minimization of $$\tau(w, \xi, \rho) = \frac{1}{2}\|w\|^2 - \nu\rho + \frac{1}{l}\sum_i \xi_i$$

subject to:

$$y_i\cdot((x_i\cdot w)+b)\geq\rho-\xi_i,$$

$$\xi_i\geq 0, \rho\geq 0$$

The above optimization tries to classify correctly as many data as possible by penalizing misclassified samples through variable ξi. At the same time, the minimization of w keeps the model as simple as possible, and the margin is made as large as possible through maximization of variable ρ. The trade-off between the model complexity and the training error is controlled by parameter ν∈[0, 1]. It is also the lower and upper bound on the number of examples that are support vectors and that lie on the wrong side of the hyperplane, respectively.

One-Class SVM

Other variants of binary SVM can also be used for training. For example, one-class SVM formulation allows learning from data with positive labeled samples only. This becomes extremely useful to deal with missing data due to occlusion and camera sampling error. The formulation is as follows:

$$\operatorname*{argmin}_{w,\xi,\rho}\frac{1}{2}\|w\|^2 + \frac{1}{\nu l}\sum_i \xi_i - \rho$$

subject to:

$$w\cdot\Phi(x_i)\geq\rho-\xi_i,$$

$$\xi_i\geq 0, \rho\geq 0$$

Instead of separating positive from negative classes as in the binary case, this algorithm separates data from the origin in feature space. Quite similar to ν-SVM formulation, the above optimization tries to keep the model simple by reducing ∥w∥ as much as possible. Points that lie on the wrong side of hyperplane or within the margin will be penalized by parameter ξi. Instead of acting on ρ as in the previous formation, the inverse of ν acts as a weight for error regularization term ξi. However, the effect of ν does not change. This parameter allows the trade-off between accuracy and model complexity. It is also equal to the upper bound on the fraction of error and lower bound on the fraction of support vectors. One can also think of one-class SVM as the density estimator which output +1 for a small region capturing most of data, and −1 for the complement. As a consequence, it produces smearing effects around sharp corners where non-shape pixels also have high estimated densities.

As far as the parameters selection is concerned, there are two feasible strategies. The straightforward way is to partition data into two subsets, one for training and another one for testing. Cross-validation can then be used for selecting the parameters set that gives best classification result on testing data. While this method is simple and effective, it requires additional computation to classify testing data. One can improve the computational efficiency of the training process by simply looking at the upper bound of testing error. This bound is a by-product of the optimization, which can be efficiently evaluated.

SUMMARY OF THE INVENTION

The embodiments of the invention provide a method for representing arbitrary 2D and 3D shapes by using radial basis function (RBF) support vector machine (SVM) classification. We call this a support vector shape (SVS) representation.

Quite different from prior art methods approaches, we consider a shape representation to be a decision function of a classifier. As strictly defined herein, the decision function is rule according to which statistical decisions are made on the basis of observations obtained. In other words, the decision function can classify the observations. As opposed to being a discrete, the decision function of the classifier is analytic, i.e., continuous and differentiable in the space containing the object.

In one embodiment, our decision function is a hypersurface of the SVM defined by support vectors that separates the positive labeled points, shape, from the negative labeled points, the shape surroundings. Instead of using the edge or surface gradients, we use the gradient of the classifier decision function. It should be noted that the feature points can also be selected directly by the decision function.

In contrast with conventional method, we consider a shape to be an analytic function of a decision boundary of the hyperplane of the SVM. This empowers the SVS representation with many advantages.

First, the representation uses a sparse subset of feature points determined by the support vectors, which significantly improves the discriminative power against noise, fragmentation and other artifacts in data.

Second, the use of RBF kernels provides affine invariant features, and allows any shape to be represented accurately regardless of its complexity.

Third, the SVS representation defines a new set of local descriptors that are determined from a highly stable decision function gradient. Therefore the SVS is robust against articulation.

Fourth, the representation is compact and easily extends to higher dimensions.

DETAILED DESCRIPTION OF THE PREFERRED EMBODIMENT

Support Vector Shape Representation

We define a SVS representation of a shape of an object on a decision function of a classifier. As defined herein, the decision function is rule according to which statistical decisions are made on the basis of observations obtained. This representation includes of two parts: feature points that indicate salient components of the shape, and local descriptors of the features that characterize these salient components in terms of statistics of the decision function.

We are the first to consider the shape representation as a classification problem. This classifier based representation offer several advantages.

Firstly, it is general enough to be applied to 2D shapes and 3D volumes, and even higher dimensional objects.

Secondly, the classification function depends only on a sparse subset of key points, which makes the representation robust against noise, missing data, and other artifacts including interior fragmentations. In addition, the descriptors themselves are particularly stable to transformations and disturbances because they are extracted from the decision function but not from the original data.

Thirdly, this representation can easily determine, with an associated probability score, whether a random point belongs to the shape, or not. This capability should not be underestimated considering the fact that the existing approaches are exceedingly inefficient, especially for 3D case. Note that, using Euclidean distance to the nearest neighbor would be unreliable for points lying close to the boundary.

Figure 5:
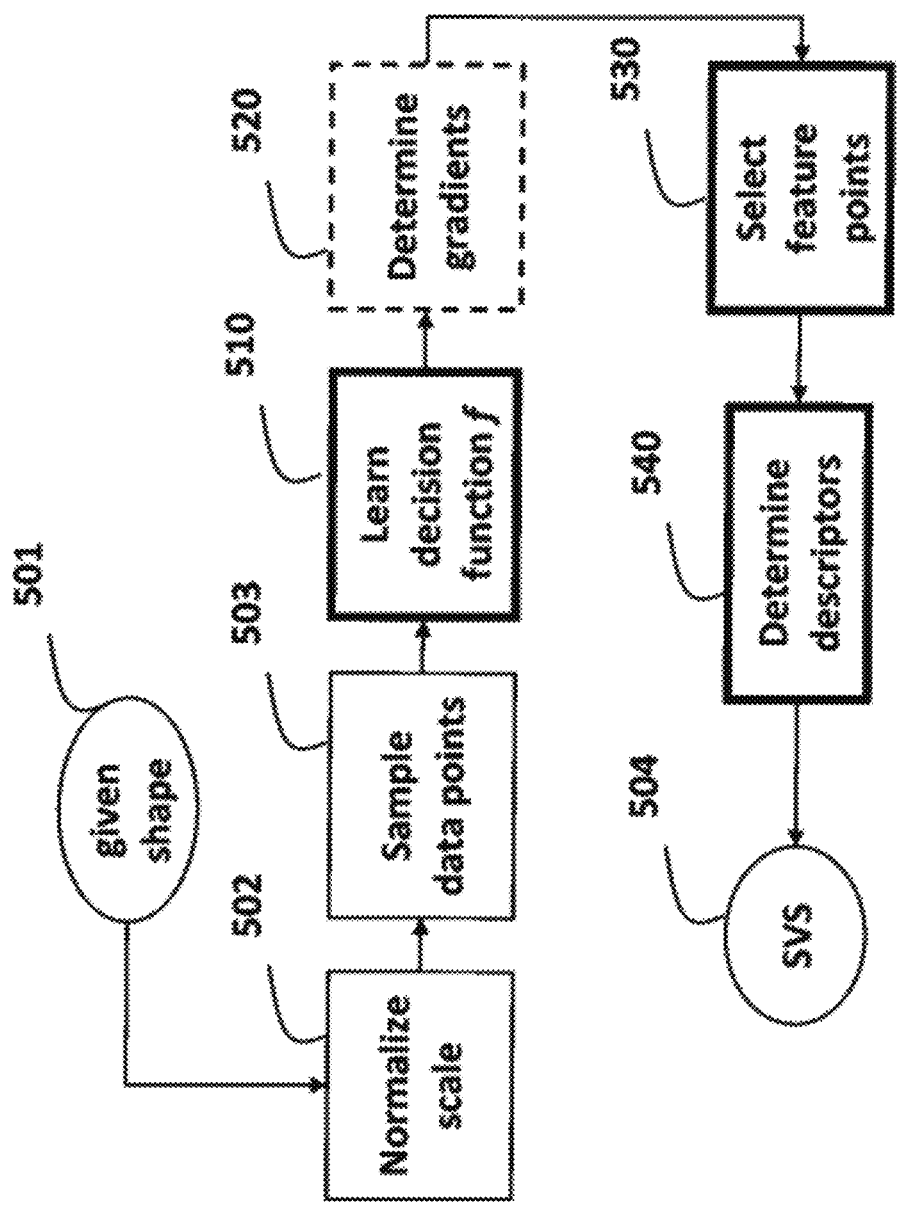
FIG. 5 is a flow diagram of a method for representing a shape of an object according to embodiments of the invention.

As shown in FIG. 5, the method for the SVS representation involves the following essential steps:

1. learning 510 a decision function from a set of points inside and outside a shape of an object;
2. determining 520 a gradient of the decision function;
3. selecting 530 feature points in the set of points using the gradient of the decision function; and
4. determining 540 a local descriptor for each feature point.

It should be noted that the feature points can be directly selected using the decision function.

Learning a Decision Function

Let $S=\{X_n\}_{n=1}^{N}$ be a first subset of points inside a shape of an object. Let $\overline{S}$ be a second subset of points not in the subset S, i.e., outside the object. We train a classifier $$f(x) = \begin{cases} \geq 0, & x \in S \\ < 0, & x \in \overline{S} \end{cases}$$

Assume $f(x)$ and $g(x)$ are two ideal classifiers representing the same shape, i.e.

$$\text{sign}[f(x)] = \text{sign}[g(x)] = \begin{cases} \geq 0, & x \in S \\ < 0, & x \in \overline{S} \end{cases}$$

It is known that if the binary shapes generated by taking the zero-level crossings of these classifiers are equivalent to each other then the decision functions are equivalent with a constant factor for real, 2D, band-limited and irreducible functions. Here, irreducible means that its Fourier transform is not factorable. The band-limited condition implies the Fourier transform has a compact region of support for finite-energy signals.

The above suggests that the gradient orientation is going to be equivalent for such two functions satisfying the above constraints. In other words, two decision functions representing the same shape are consistent, and exhibit invariance properties in terms of their gradient orientations if these functions are real, 2D, band-limited, irreducible, and have almost identical responses.

One such example is the radial basis function (RBF) support kernel machine SVM operates on. It is real and band-limited: it has the form of the sum of finite number of weighted exponential, thus, its Fourier transform is a sum of weighted exponentials, which has finite-energy and a compact region of support especially when the insignificant coefficients of the radial kernels are disregarded.

For an ideal shape classifier, the decision function is positive for the inside shape regions, zero on the shape boundary S, and negative for outside shape regions. In other words, the gradient of the decision function along the tangent space of a point on the boundary S is zero. This means that the gradient of the decision function is perpendicular to the tangent plane, thus, the gradient itself coincides with the normal vector of the shape. Therefore the gradient $\nabla f$ at a shape boundary point is a close approximation for the normal vector at that point.

To our advantage, the SVM decision function is analytic, i.e., it is in the form of weighted sum of kernel responses, thus its gradient can be efficiently determined at a point in the space. Furthermore, the RBF kernel functions can effectively map data $x_n$ to an $\infty$-dimensional space where S and $\overline{S}$ would be linearly separable, thus even for intricate boundaries a high classification performance is guaranteed. In addition, SVMs would still perform well for the unbalanced number of positive and negative samples in training.

Because the decision function in only depends on the distance between points, the SVS representation of the descriptors is invariant to translation and rotation of the shape. Note that, for linear and polynomial kernels, such invariance does not apply as they impose inner products of point coordinates. Furthermore, the γ multiplier in the kernel function is inversely proportional to the squared scale change.

For a given shape with unknown scale change from its original, the mean of pair-wise distances between all points can be used to normalize the shape using a scale parameter. This scale normalization technique has been used in the shape context and is proven to be effective. In addition, our analysis demonstrate that small γ to variations would not perturb the best possible classification accuracy. In one embodiment, we determine the pair-wise distances of the subset of object points. Then, we find the mean of these distances. Finally, we normalize the point coordinates such that the mean distance becomes 1. In other words, we divide the coordinates of the points by the mean distance. In another embodiment, we use the maximum distance instead of the mean distance for the normalization in the same fashion. Incase the object is not centered, that is, the center of object, which can be the center-of-the-mass, is not on the origin, e.g. for 2D on (0, 0), we center the object by translating the center-of-the-mass to origin before the above normalization.

For training, we select a random subset of internal points to be positive training samples from a given shape. Another random subset of points outside the shape is chosen to be negative samples. Random selection is preferred just for computational efficiency. The input to the classifier is the coordinates and the corresponding inside/outside labels of the training points.

Figure 1:
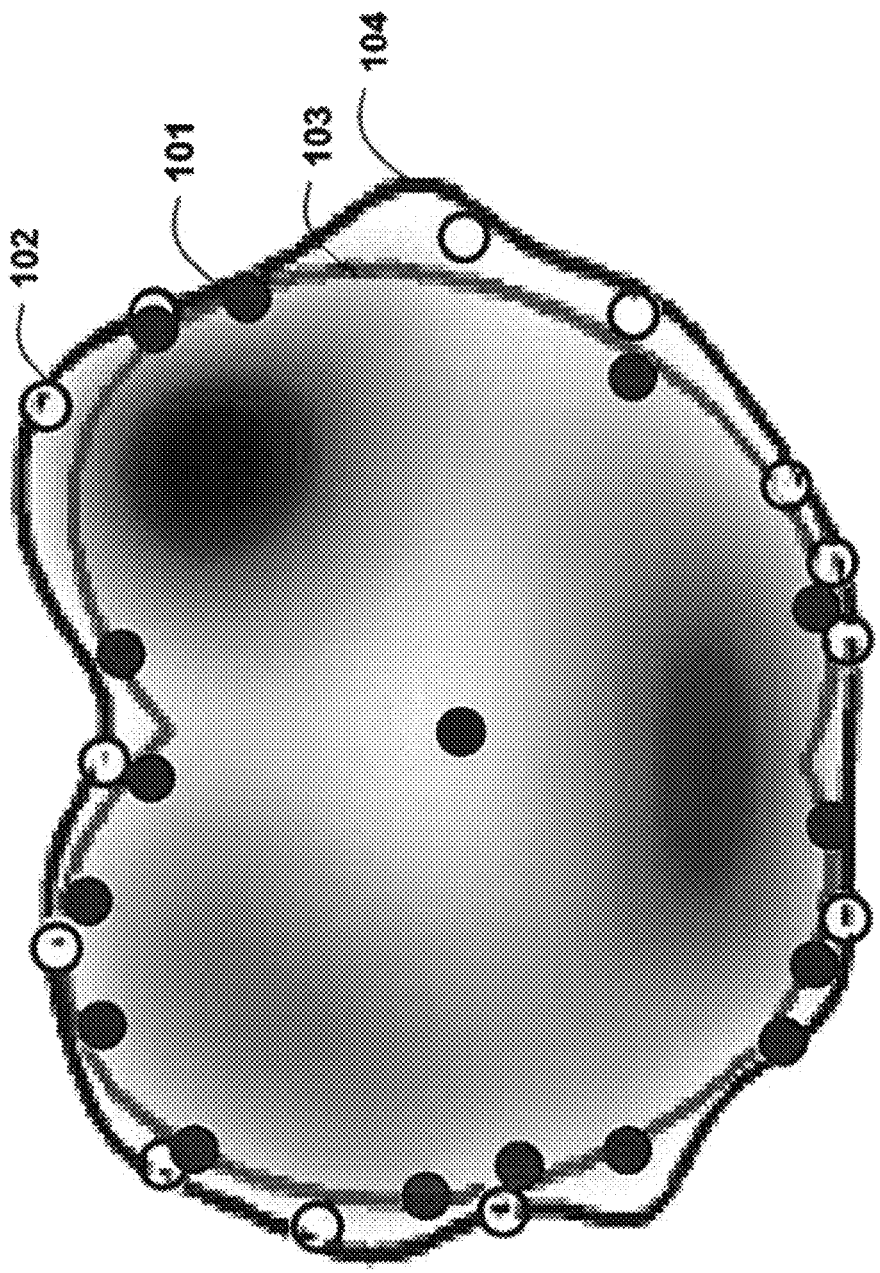
FIG. 1 is a schematic of a shape in an image represented by radial basis function support vectors according to embodiments of the invention.

FIG. 1 shows support vectors and decision boundaries for a sample shape. As shown in FIG. 1, support vectors (solid 101 for weights $\alpha > 0$ and open 102 for weights $\alpha \leq 0$). Also shown is the boundary 103 of the decision function (x)=0, and the original shape 104 for the support vectors. It can be noticed that support vectors is not required to lie on shape edges. This is because the kernel mapping to high dimensional space, where non-edge points might happen to lie on the decision boundary of the learning algorithms. The number of support vectors is typically varies from 0.1% to 3% of the total number of points. Note that the variation of the boundary does not distort the final descriptors as we use the gradient of $\nabla f$ rather than $f$ (or even worse, the original image edges).

For v-SVM formulation, the larger (smaller) we make v the more (less) points are allowed to lie inside the margin, which gives coarser (finer) shape representations. It is possible to use a small value to result in a larger number of support vectors to allow accurate representation of complex shapes, while smaller numbers of support vectors enhance the robustness against corrupted training data. As SVS involves a training process, it might vary with the selection of the model parameters. Fortunately, this representation is quite stable under certain conditions.

SVS Feature Points

SVS has two constituents; feature (interest) points and their descriptors. This section describes possible ways of selecting the feature points. All these methods use the previously described decision function.

It is desired that the feature points to be stable under local and global shape perturbations (including affine transformations and articulated motion) as well as noise and other artifacts. Such feature points should be reliably determined with high degree of reproducibility. In addition, the local descriptors determined at these feature points have to be discriminative enough for reliable shape matching and registration, therefore structure around the feature points should be rich in terms of local information content.

Support Vector Based Feature Points

We only need the support vectors to construct the decision function and its gradient, thus support vectors themselves seem to be good candidates for feature points.

One can ask whether the set of support vectors enable reliable shape matching. The answer to this question largely depends on the problem at hand. For non-articulated transformations, the support vectors remain stable. Constraining the classification accuracy to be sufficiently high (e.g. 99%) and preventing the kernel width from changing too much would produce similar support vectors. Yet, if the kernel width changes too much, e.g. 20 times, support vectors change significantly. Besides, support vectors are sensitive to shape articulations because the topology changes.

Gradient Based Feature Points

We state that the gradient orientation is stable while gradient magnitude differs only by a constant factor, i.e. the gradient direction at x remains unchanged if such ideal classifiers exist;

$$\frac{\nabla f(x)}{\|\nabla f(x)\|} = \text{constant},$$

where $$\nabla f(x) = 2\gamma \sum_{i=1}^{m} \alpha_i \exp(-\gamma \|x - x_i^*\|^2)(x_i^* - x).$$

The condition $$\text{sign}[f(x)] = \text{sign}[g(x)]$$

is hard to satisfy strictly due to the discrete nature of sampled digital data. A natural question to ask is under what parameterization the decision functions exhibit invariant properties. To evaluate this, we randomly choose a set of 500 points and examine their gradients as the training parameters vary (by $\gamma$ 6 times and v by 10 times with respect to the smallest value of each parameter) among the 66 different SVSs we tested. Note that each different parameterization may generate a different decision function in magnitude, however we are interested in how the direction of the gradient of the decision function changes. Therefore, to account for the multiplication factor of the decision function, we normalize the decision function values by their mean value yielding relative magnitudes.

Figure 3:
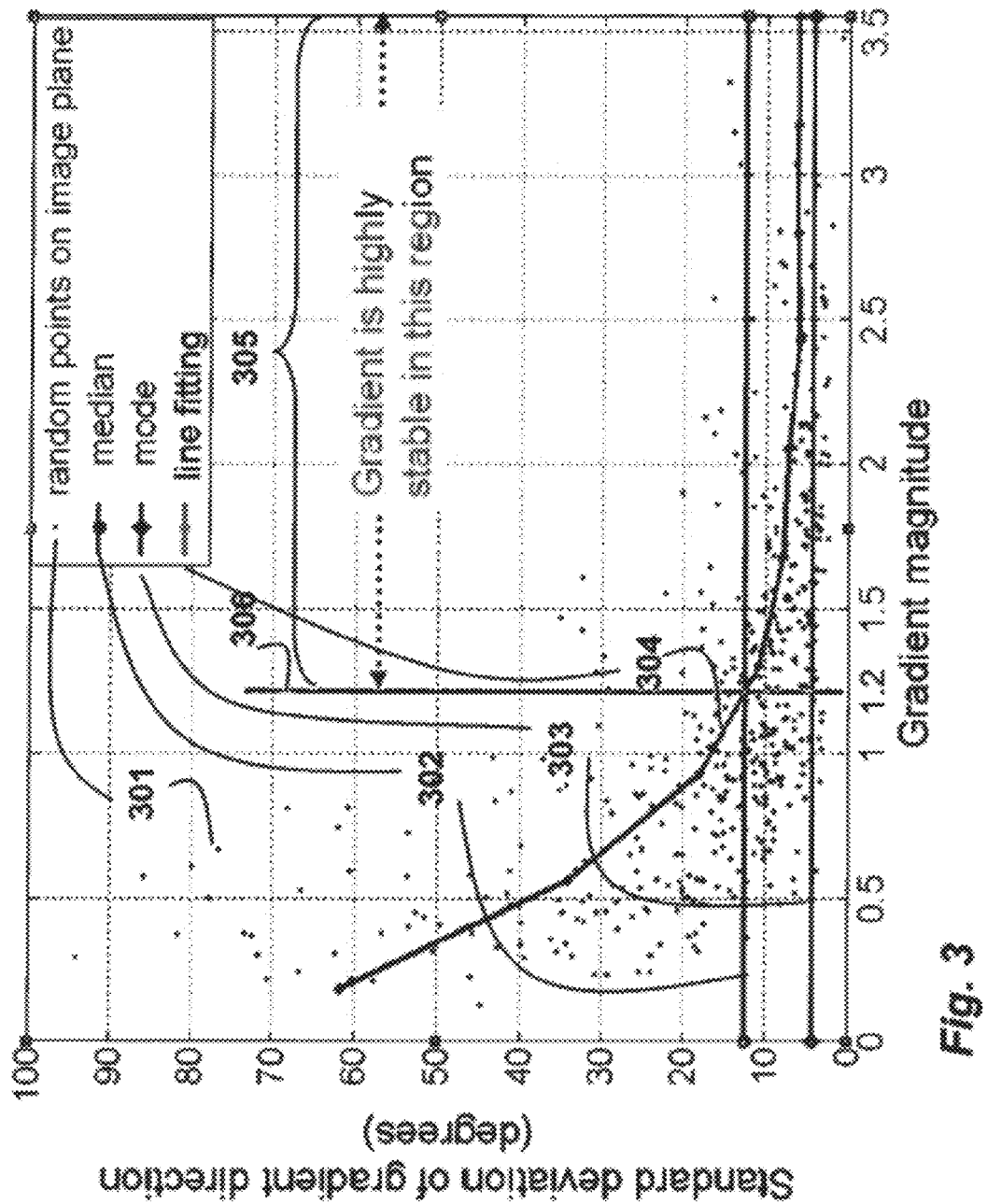
FIG. 3 is a graph of statistics of randomly selected points on an image plane according to embodiments of the invention.

FIG. 3 shows statistics of randomly selected points 301 on an image plane, the median 302 separating the higher and lower values, the mode 303 of the most frequently occurring values, and a line 304 fitted to the points. The vertical axis indicates the standard deviation of the gradient deviation, and the horizontal axis indicates the gradient magnitude. FIG. 3 also shows a region 305 where the gradient is highly stable.

As shown in FIG. 3 the variance $\sigma$ of gradient direction changes with respect to the gradient magnitudes for the points. This might be due to imperfections in the classifier, and the nature of the training process. However, the variation exhibits a strong dependency on gradient magnitude. A higher gradient magnitude has a smaller standard deviation. For points with gradient magnitude of more than two, the standard deviation, which directly corresponds to direction changes, is as small as 4°.

Figure 2:
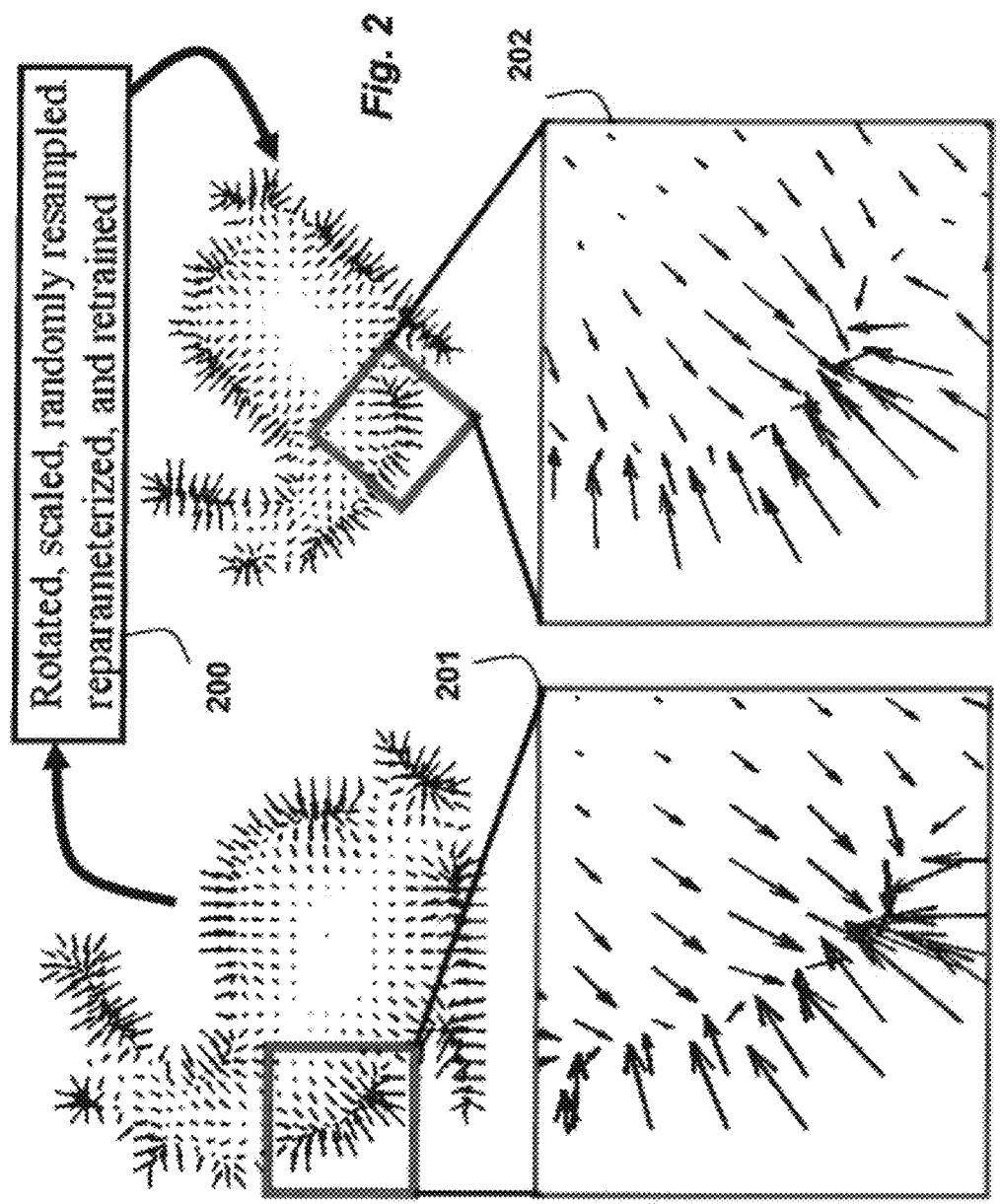
FIG. 2 is a schematic of an original shape and a transformed version of the shape according to embodiments of the invention.

FIG. 2 shows an original shape 201 and a transformed 200 version 202 of the shape 101. The gradient directions almost stay stable, even if the shape transforms and completely different set of parameters and points are selected for the SVS 202.

FIG. 2 shows how the standard deviation of gradient direction changes with respect to the gradient magnitudes for these 500 points. One can easily notice that the gradients and magnitudes vary with respect to the training parameters. This might be due to classifier's imperfection, and the nature of the training process. However, the variation exhibits a strong dependency on gradient magnitude. The higher the gradient magnitude gets, the smaller the standard deviation is. For points with gradient magnitude of more than two, the standard deviation, which directly corresponds to direction changes, is as small as 4 degrees.

The number of support vectors is an excellent indicator of the complexity of the shape, thus the number of feature points are set proportional to the number of support vectors. We apply an iterative search method that finds the maximum gradient magnitude point on $|\nabla f|$ and removes a close neighborhood around that point (to eliminate feature point collapse) until it selects half as many feature points as the number of support vectors. These feature points are typically close to shape contour, but not necessarily on it. More importantly, they are resilient to random noise and other artifacts (fragmentation, crevices, etc) of the boundary.

Curvature Based Feature Points

It is possible to select points with high-curvature on SVS by looking at the Hessian matrix of a decision function. More specifically, for the 2D case, we first solve the eigenvalues of the Hessian matrix, which is proportional to curvatures.

$$H = \begin{bmatrix} \frac{\partial^2 f}{\partial x_1^2} & \frac{\partial^2 f}{\partial x_1 \partial x_2} \\ \frac{\partial^2 f}{\partial x_1 \partial x_2} & \frac{\partial^2 f}{\partial x_2^2} \end{bmatrix} = Q \begin{bmatrix} \lambda_1 & 0 \\ 0 & \lambda_2 \end{bmatrix} Q^{-1}$$

Points with high curvatures associate with large eigenvalues of both dimensions. To mitigate noise effects, the decision function can be smoothed at different scales before determining curvatures. Remember that the decision function is a mixture of Gaussian functions. Therefore, its smoothed versions produced by convolving with a Gaussian kernel are also a mixture of Gaussian, whose close-form expression can be easily determined.

An advantage of this selection scheme is that local descriptors are highly discriminative. For instance, SIFT can be determined to find point-wise correspondences for aligning two similar shapes. However, this point selection method is not appropriate for shape matching. For example, choosing only those points around corners makes it impossible to differentiate a rectangle from a square. This disadvantage arises for shapes characterized mainly by their dimensions and shapes characterized by the arrangement of similar local structures. Another disadvantage of this method is the difficulty of determining curvatures when generalizing to higher dimension.

Entropy Based Feature Points

Another possibility is selecting a small subsets of points whose local gradient orientation distributions have high entropies, where we use standard definition of entropy:

$$-\sum_{i=1}^{n} p_i \log_2(p_i)$$

where $p_i$ is the $i^{th}$ bin of the orientation probability distribution function and n is the number of bins. High entropy is equivalent to high variation of gradients orientations. Therefore, it is a good indication of complex local topologies of SVS, therefore more discriminative local descriptors. This strategy has similar philosophy with high-curvature selection method. However, it does not involve the computation of principal curvatures which can be difficult for higher dimensional cases.

Spatial constraints have to be incorporated for reliable shape matching. One can constructing an ordered list of the feature points of the object by ordering the feature points according to angles from the center of the object in a circular fashion. In this case, dynamic programming is applicable for matching the two sequences. Rough alignment of the start and end points of two sequences is useful for this approach to converge to correct alignment. Another possibility is to construct an undirected graph from the selected points set. Spectral graph matching algorithm can be used to first match two shapes and find the matching score.

Figure 4:
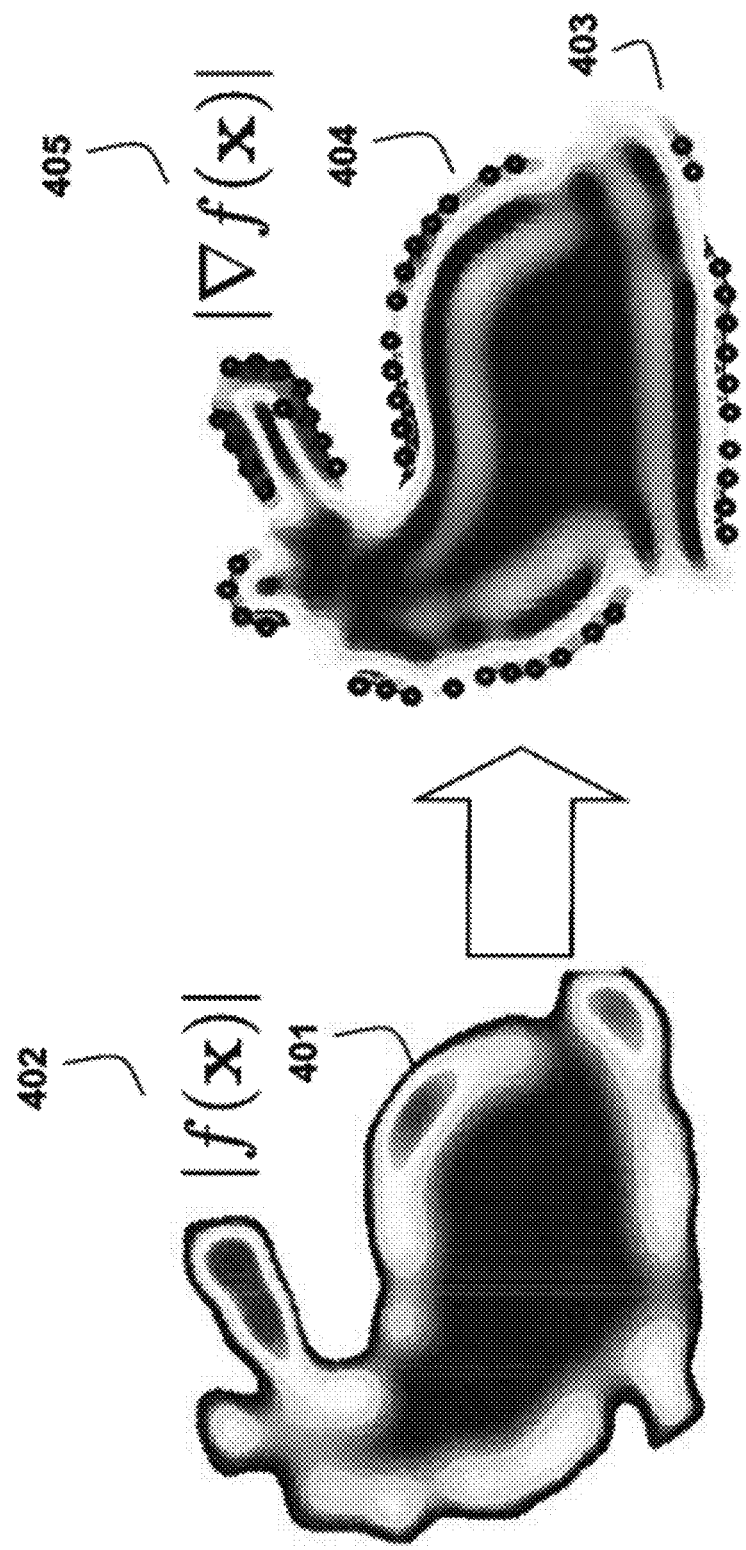
FIG. 4 is a schematic selecting feature points for a sample shape according to embodiments of the invention.

FIG. 4 shows selected feature points for a sample shape, e.g., the well known "Stanford Bunny" that is for testing many computer graphics models. with a response 401 of a decision function 402 and gradient magnitudes 403 of the decision function for the SVS representing of the Stanford Bunny. Points 404 with higher values in $\nabla(fx)$ 405 are good candidates to be selected as discriminative feature points and support vectors.

Ordered Feature Points

After we determine the feature points, in one embodiment for 2D we construct an ordered list. We use the gradient $\nabla f$ of the decision function since the gradient orientation is stable, especially for higher gradient magnitude points, we select a small subset of such points and build a list by ordering them according to their angles from the center of the shape in a circular fashion. The starting (0 degree) orientation of circular sweep is set with respect to a dominant gradient direction, which is the highest gradient direction in a global gradient distribution function determined from the $\nabla f$ as all the information available at this point. Such a starting point also improves the feature alignment of two shapes when we match them. Alternatively, we select the feature point that has a highest gradient magnitude and set it as a first element of the list. Then, we search for the feature point that has the lowest angle from the previous feature point in the list in a circular counterclock-wise and add that point in the ordered list.

SVS Descriptors

SVS facilitates the computation of a set of descriptors for the feature points selected by the gradient of the decision function. Below, we give only a few examples of possible descriptors for 2D and 3D data.

2D Descriptors

We determine a local histogram of oriented gradients (HOG) descriptor around each of the points on the decision function gradient $\nabla f$ (but not on the conventional edge gradient), thus this HOG is significantly different from the existing descriptors.

HOG seems to be a natural descriptor for SVS. For a given feature point, a 4×4 array of 8-bin orientation histograms are constructed within a local window. The size of the window is set to be the 0.25×0.25. Our exhaustive experiments indicated that this size provides satisfactory results for both very coarse fine shapes. A histogram is populated for each sub-block by aggregating the gradient magnitude of the decision function into the corresponding orientation bin of the gradient direction of the decision function. To prevent from the coarse binning issues, the value of each gradient point is interpolated into adjacent histogram bins. Finally, the mean of gradients for the local window is taken to be the orientation of the descriptor and the histogram bins are reoriented accordingly with respect to this mean orientation to achieve the rotation invariance of the descriptor. The histograms are then concatenated into a 128-dimensional vector.

The way to determine this descriptor is similar to the conventional definition. However, there are still some significant differences. For instance, SVS only considers points inside the decision boundary, or equivalently points at which $f(x)$ is greater than zero, to build the descriptor. This enhances the robustness against shape articulations. Because gradients with larger magnitudes are more stable, the contribution of each gradient to the histogram is set to be proportional to its magnitude. In HOG, gradients are normalized to unit length in order to account for illumination variation. A Gaussian kernel is imposed to weight gradients based on their relative distances with respect to the feature point. This spatial weighting puts more emphasis on the gradients that are closer to the center and helps improving the discriminative power of the local descriptors.

3D Descriptors

Concentric Ring Signatures (CORS), see the related U.S. patent application Ser. No. 13/026,382, is used as the descriptor for our 3D feature points. CORS is constructed in a circular fashion around a center point. Each point is projected onto a fitted plane. The orthogonal distances are indexed by rotation angles and radial distances. The advantage of CORS over other 3D descriptors, e.g., spin image, is that it is more compact and discriminative. Another advantage is that CORS computation can be accelerated if points are oriented. Because SVS provides each point cloud with a stable orientation of the decision function, it allows the efficient construction of CORS descriptors.

Determining Distance

We determine the distance between two shapes. Given two SVS decision functions $f_A(x)$ and $f_B(x)$, for shapes A and B respectively, we determine a distance score between their descriptors.

Because the feature points are already ordered with respect to the dominant gradient direction, initial alignment for the shapes with similar overall structures is almost accurate. Next, we use the local descriptors for comparison of two shapes. The advantage of using local descriptors is that they are robust against occlusion and shape articulation.

Let two sets of the descriptors for two shapes A and B be $$\Lambda^A: \{\lambda_1^A, \lambda_2^A, \ldots \lambda_t^A\}$$

and $$\Lambda^B: \{\lambda_1^B, \lambda_2^B, \ldots \lambda_s^B\}$$

where t does not have to be equal to s assuming t>s. The correspondence is established through a mapping function h such that $$h: \Lambda^A \leftrightarrow \Lambda^B$$

If a descriptor $\lambda_i^A$ is matched to another $\lambda_j^B$, then $$h(i^A) = j^B$$

and $$h(j^B) = i^A$$

We define a cost function as $$E(h) = \sum_{1 \leq i \leq t} \epsilon(h(i), i),$$

where the descriptor distance is determined using $\chi^2$ statistic $$\epsilon(h(i), i) = \sum_{1 \leq b \leq 128} \frac{[\lambda_{h(i)}^A(b) - \lambda_i^B(k)]^2}{\lambda_{h(i)}^A(b) + \lambda_i^B(k)}.$$

This cost represents the overall distance for the corresponding pairing of the descriptors. Note that, the mapping h is neither one-to-one, nor overlapping, but keeps the ordering of the descriptors.

To minimize the cost function E, we use the dynamic programming to find the solution. It is worth noting that the start points and the end points of two sequences are already roughly aligned for the dynamic programming algorithms to converge to the correct solution. Under certain conditions, the initial alignment provided by the ordered lists may not be valid. To overcome this, it is possible to find the angle that maximizes the correlation between two global gradient direction histograms of two given shapes before minimizing the above cost function.

SVS Embodiment

As shown in FIG. 5, we construct the SVS representation by randomly sampling 503 the first subset of the points S inside the shape to be positive training samples for a given shape. The second subset of points $\bar{S}$ outside the shape is randomly selected to be negative samples. The random selection is preferred for computational efficiency. The number of positive and negative samples can be unbalanced. The points can be pixels having 2D coordinates in a 2D image of the shaper, or pixels having 3D coordinates in a 3D image obtained by scanning the object. Input to the classifier is the coordinates and the corresponding labels (positive or negative) of the samples. After we learn 510 the decision function $f$, we determine 520 gradients $\nabla f$ of the decision function. Each gradient has a magnitude and an orientation. The orientation of the orientation is stable for points with a gradient magnitude larger than a predetermined threshold, as described below. Therefore, we select 530 points from the first subset that have magnitudes larger than the threshold as features, and construct a list by ordering the points according to orientations (angles) from a center of the shape in a circular fashion.

We determine 540 a local histogram of oriented gradients (HOG) descriptor around each of the points on the decision function gradient $\nabla f$, but not on the conventional edge gradient as descriptors. Thus, our HOG is significantly different from conventional HOG descriptors. The SVS includes the list of points associated with their descriptors.

The steps of the method can be performed in a processor connected to a memory and input/output interfaces as known in the art.

Subsequently, the support vector machine 504 can be used to classify an unknown shape to determine whether the unknown shape is similar to the shape of the object.

For point clouds data, estimating gradients at every points is computationally prohibited. The SVS representation, however, provide a natural orientation at every point, which is the first derivative of the classification function $\nabla f(x)$. This direction needs not and is typically not the same with gradient direction on the object's surface. From now on, we use the term gradient to refer to $\nabla f(x)$, unless otherwise stated.

Effect of the Invention

The invention represents a shape as a decision boundary of a classifier. This decision boundary is a hypersurface that separates positive labeled points, shape, from the negative labeled points, its surroundings. Instead of using the edge or surface gradients, we use the gradient of the classifier decision function.

The shape representation method described herein represents 2D and 3D shapes using support vector classifiers.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for representing a shape of an object represented by a set of points, wherein the set of points include points inside, outside and a boundary of the shape, the method comprising the steps of:
    learning a decision function from the set of points, wherein the decision function is a hypersurface defined by support vectors of a radial basis function (RBF) support vector machine (SVM) that separates the set of points inside and outside the shape, such that the hypersurface and the support vectors represent the shape of the object;
    selecting feature points in the set of points using the decision function; and
    determining a local descriptor for each feature point, wherein the steps are performed in a processor.

2. The method of claim 1, further comprising:
    determining a gradient of the decision function, and wherein the selecting uses the gradient of the decision function.

3. The method of claim 1, wherein the points are pixels in a 2D image of the object.

4. The method of claim 1, wherein the points are samples on a 3D shape of the object.

5. The method of claim 1, wherein the decision function is obtained by training a discriminative classifier using the set of points.

6. The method of claim 1, wherein the decision function is positive for the points inside shape, zero for the points on a boundary of the shape, and negative for the points outside the shape.

7. The method of claim 1, wherein the learning uses subsets of randomly selected points.

8. The method of claim 1, wherein the feature points are based on gradients of the decision function for the set of points.

9. The method of claim 1, wherein the feature points are based on a curvature of the decision function for the set of points.

10. The method of claim 1, wherein the feature points are based on gradients of entropy of the decision function for the set of points.

11. The method of claim 1, wherein the local descriptors are histograms of oriented gradients of decision function around each point.

12. The method of claim 1, wherein kernels of the RBF provide affine invariant features.

13. The method of claim 1, wherein the decision function is analytic, and in a form of a weighted sum of responses of the kernels.

14. The method of claim 1, wherein the local descriptors are invariant to translation and rotation of the shape.

15. The method of claim 1, further comprising;
    normalizing the shape.

16. The method of claim 15, further comprising;
    determining a scale parameter by a mean pair-wise distances of the set of points; and,
    dividing the original point coordinates using the scale parameter.

17. The method of claim 1, further comprising:
    classifying unknown shapes according to the feature points and their local descriptors.

18. The method of claim 17, further comprising:
    constructing an ordered list of the feature points of an object by ordering the feature points according to angles from the center of the object in a circular fashion.

19. The method of claim 18, further comprising:
    selecting the feature point that has a highest gradient magnitude;
    setting the selected feature point as a first element of the list; and
    assigning the remaining feature points in a circular counterclock-wise in the ordered list.

20. The method of claim 18, further comprising:
    determining a match distance for the ordered lists of two 2D objects.

21. The method of claim 20, further comprising:
    determining a cost function that represents an overall distance for corresponding pairing of the descriptors using a descriptor distance;
    minimizing the cost function by dynamic programming to obtain a mapping function; and
    determining a match distance using the mapping function.

* * * * *